Dec. 8, 1931.   G. W. SCHANIL   1,835,095
DISK CULTIVATOR ATTACHMENT
Filed Sept. 4, 1928
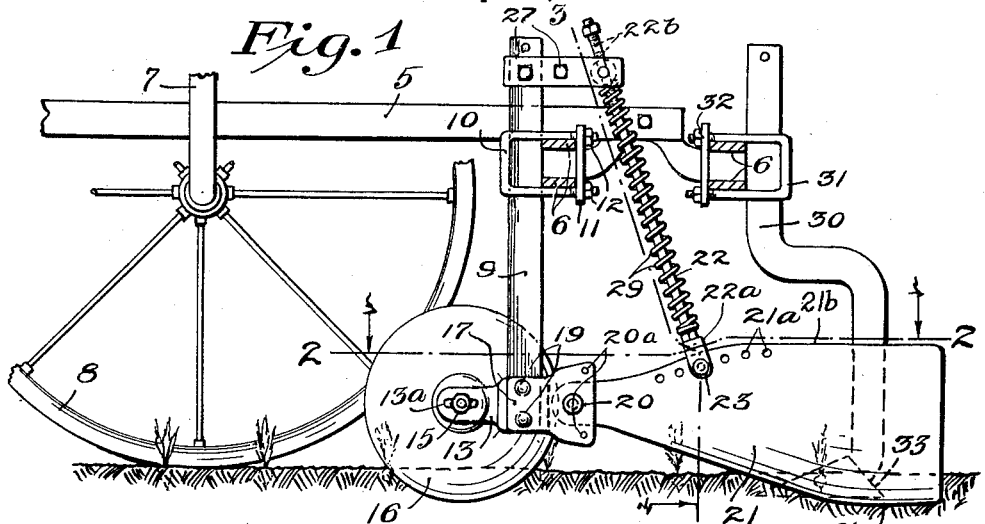
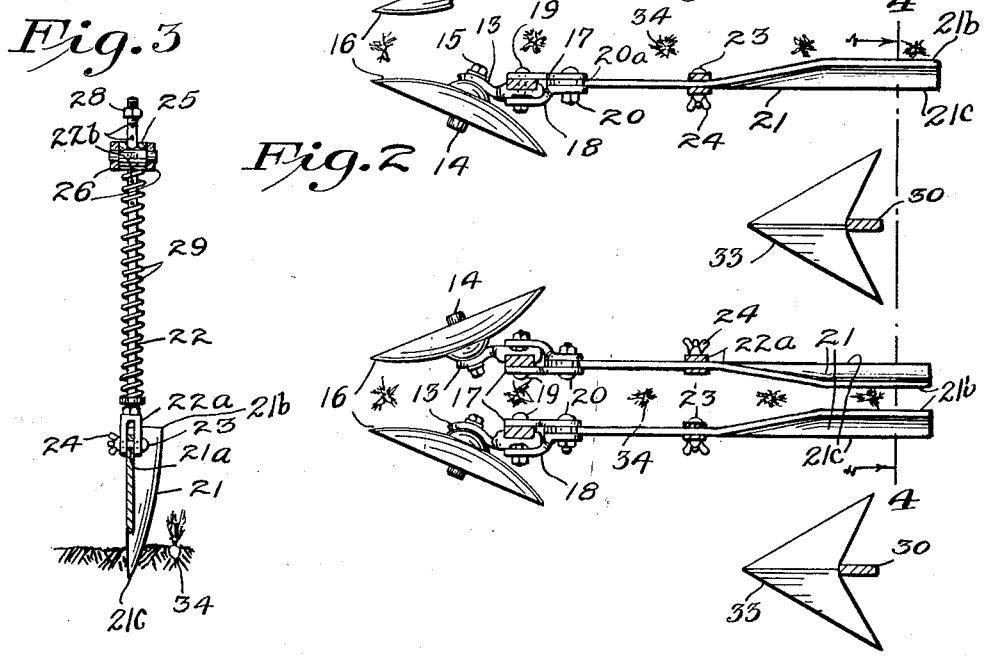
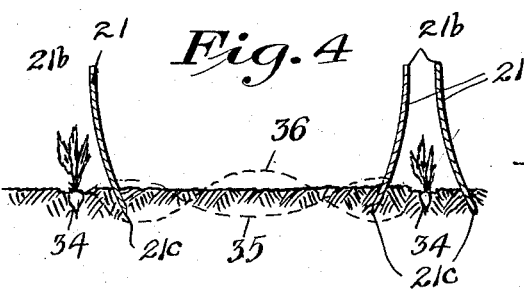
Inventor
George W. Schanil
By his Attorneys Patented Dec. 8, 1931

1,835,035

UNITED STATES PATENT OFFICE

GEORGE W. SCHANIL, OF LAKE LILLIAN, MINNESOTA

DISK CULTIVATOR ATTACHMENT

Application filed September 4, 1928. Serial No. 303,751.

This invention relates to a cultivator, and while the invention is applicable to cultivators of various types, it particularly is designed for use in a cultivator for cultivating beets. It is the custom to cultivate the beets when quite young, and it is desirable to have some means for keeping the young plants from being covered with the dirt. The dirt between the beet rows is cultivated with a shovel or share and the ground next to the beets is cultivated at varous times with a revolving disk. It is desirable to have these disks so that they can be readily removed and replaced when desired.

It is an object of this invention, therefore, to provide a cultivator having a frame and a standard supported by the frame and extended downwardly, said standard having means adjacent its lower end with which the disk is revolubly connected, and to which the shield extending rearwardly from the standard is also connected.

It is another object of the invention to provide a cultivator having a shield of novel and efficient shape.

It is a further object of the invention to provide a cultivator comprising a frame, a standard extending downwardly therefrom, a shield pivotally connected adjacent the bottom of the standard adapted to move in the ground, and having resilient means holding the same in its proper position.

It is still another object of the invention to provide a cultivator adapted to cultivate a row of plants and having revolving concave disks at each side of said row respectively, said disks diverging at their rear sides, shields extending rearwardly from each of said disks, shares at each side of said shields, said shields extending upwardly away from said shares.

These and other objects and advantages of the invention will be fully set forth in the following description made in connection with the accompanying drawings, in which like reference characters refer to similar parts throughout the several views and in which:—

Fig. 1 is a vertical section through the cultivator, showing the arrangement of the parts;

Fig. 2 is a horizontal section substantially on line 2—2 of Fig. 1;

Fig. 3 is a vertical section taken on line 3—3 of Fig. 1, as indicated by the arrows; and Fig. 4 is a vertical section taken substantially on line 4—4 of Fig. 2, as indicated by the arrows.

Referring to the drawings, a portion of a cultivator is shown, in which it will only be necessary to consider the horizontal and longitudinally extending frame member 5 to which is connected the transversely extending members 6. The frame is carried on a suitable axle 7 having journaled thereon the wheels 8. Standards 9 are secured to the cross members 6 of the frame, by the U-shaped clips 10 which embrace the members 6 and standards 9 and are clamped thereto by the clamping plate 11, moved and held in place by the nuts 12 threaded on the ends of the clip 10. The standard 9 has secured thereto adjacent its lower end a member 13 which may be in the form of a casting, which extends forwardly from said standard and has a slot 13a extending horizontally therein. A stud 14 is clamped in said slot by the nuts 15 threaded thereon, and a disk 16 is revolubly mounted on said stud 14. The member 13 is recessed to fit over the standard 9 and is clamped thereto by the plates 17 and 18, the latter of which overlies member 13, said members 17 and 18 being clamped to the standard 9 and against member 13 by the headed and nutted bolt 19. The members 17 and 18 are formed with rearwardly projecting portions which are spaced and between which is pivoted by the headed and nutted bolt 20 the forward end of a shield 21. As shown, this shield has a lower edge 21c extending downwardly and merging on a curve with a horizontal rear portion. The rear edge of the shield is shown as vertical and the top edge 21b thereof for the greater portion is horizontal, the same sloping downwardly slightly at its forward end to the pivot 19. Said shield at its widest portion is inclined upwardly and laterally, as shown in Figs. 3 and 4. The shield 21 has a plurality of spaced holes 21a adjacent its top edge, into any one of which may be connected the bifurcated end 22a of a rod 22, by means of the bolt 23 provided with the wing nuts 24. The rod 22 extends upwardly and through a block 25 having reduced end portions journaled in the parallel sides of the bracket 26 clamped to the standard 9 by the headed and nutted bolts 27. Rod 22 is threaded at its upper end and arranged with a nut 28 forming a stop. A compression coil spring 29 surrounds rod 22, bearing at one end against a nut on said rod engaging the end 22a thereof, and at its upper end against the block 25. Rod 22 has holes 22b therethrough for receiving cotter pins and holding shield 21 raised if desired. Pins 20a between members 17 and 18 form stops limiting the movement of shield 21.

The horizontal frame members 6 in the rear have standards 30 secured thereto by the clips 31, and clamping bolts 32 similar to the clips and plates 10 and 11 already described, which standards 30 are shown as offset rearwardly and having secured to their lower ends the shovels or shares 33.

In operation the disks 16 will be arranged in pairs, as shown, the members 13 being arranged in oppositely disposed pairs so that the disks 16 diverge at their rear ends. The rows of plants 34 thus have the disks and shields 21 at either side thereof, while the shares 33 travel centrally between the rows of plants. In the cultivation of the beets, when the plants are quite small, the cultivator will be used having the disks, shares and shields thereon. The shields 21 are adapted to move some distance into the ground as shown in Fig. 1. The shields move along in the groove or furrow cut by the disks 16 and if any weeds or other obstructions are encountered, the shields will ride up over the same, due to the inclined lower edge compressing the spring 29. When the obstruction is passed, the shields will be moved downward into the proper position. As the disks move along, they cut a groove, turning the dirt away from the plants, and the dirt between the rows and any weeds growing between the rows are cut by the shares 33 which substantially level the ground thrown up by the disks. The dirt moved to the sides by the shares is kept from covering up the plants by the shields 21. The dirt falling against the inclined sides of the shields which slope upwardly away from the shares, slides down the shields as they move along, and is thus kept from falling on the plants. The inclination of the shields is thus quite important. The second cultivation also uses the parts as already described. When it is necessary to block and thin the beets the shovel is raised upward thus putting it in a position where it is not in contact with the soil and only the disks are in operation, cutting away the dirt from the beets and laying it aside, filling the groove formerly made by the large shovel. This leaves the ground level. After this cultivation it is then common to have the laborers, such as the Mexicans, block out the beets, leaving plants eight to ten inches apart. After the beets are blocked and thinned the shovel is again turned down for cultivation. This is the very most important time when the disks should be on, as the combination of the two, namely, the disk and shield, are most needed to protect the beets, for at this time the beets are in their most delicate condition. The disks and shovels are both used until the leaves of the plants have grown out between the rows so that there is danger of cutting off the leaves with the disks. Then and not till then are the disks removed and the shields raised so as to allow the dirt to be thrown amongst the beets by the shovels. With applicant's construction, these disks can readily be removed by merely removing the bolt or stud 15. The beets are thus cultivated as often as time will permit, with just the shovels. This throws up a ridge along the rows, leaving a depression in the center, as indicated by the line 35 in Fig. 4. When the disks are used, the same tend to throw up a ridge between the rows, leaving a depression adjacent the rows as shown by the line 36 in Fig. 4.

From the above description, it is seen that applicant has provided a very simple and efficient structure and one which enables the disks 16 to be quickly removed and replaced, and one which produces a very effective shield for protecting the beet plants from the dirt moved by the shovels. With this arrangement it is possible to do rapid work and to take care of a much larger area of beets. It will be readily seen that applicant's means secured to the bottom of the standard 9, shield 21 and its holding parts, including rod 22 and bracket 26 can be applied to a standard cultivator. The invention thus forms a convenient attachments and one adding greatly to the efficiency of the cultivator. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A cultivator having in combination, a frame, a substantially vertical standard carried by said frame, a supporting member secured adjacent the bottom of said standard extending forwardly and rearwardly therefrom, a disk revolubly carried at the forward end of said member, and a shield carried by the rear end of said member, constructed and arranged to enter the ground and move in the furrow made by said disk.

2. A cultivator having in combination, a standard, a supporting member adjacent the bottom of said standard, a disk revolubly mounted in said member, a shield pivotally mounted at its front end to said member in the rear of said disk and extending rearwardly from said member, and yielding means carried by said standard holding said shield in position.

3. A cultivator adapted to travel adjacent a row of plants having in combination, a pair of revoluble concave disks, said disks having their concave sides directed away from each other being disposed respectively at opposite sides of said row of plants in diverging relation, a shield comprising a member of sheet material pivoted at its forward end in the rear of each of said disks, said shields travelling in the furrows produced by said disks, and a plowing tool at the outer side of each of said shields, said shields inclining upwardly and laterally away from said shares.

4. A cultivator having in combination, a substantially vertical standard, a supporting member adjacent the lower end of said standard extending forwardly and rearwardly therefrom, a shield pivoted at its forward end to said member, said shield being of sheet material and flaring rearwardly, a bracket at the upper end of said standard, a rod pivoted to the shield adjacent the upper edge thereof, a block swivelly mounted in said bracket through which the upper end of said rod passes, and a compression spring surrounding said rod, bearing against said block and pressing said shield downwardly.

5. An attachment for a cultivator comprising a bar forming a vertical standard, means for clamping said bar to the frame of said cultivator, a member extending transversely of the standard at the lower end thereof and extending forwardly and rearwardly of the cultivator, a revoluble disk carried at the front end of said member, said disk being inclined to the longitudinal center line of the cultivator, a shied formed of a piece of sheet material and disposed substantially in a vertical plane, pivoted at its front end to said member and extending rearwardly therefrom, and adjustable means for yieldingly holding said shield against upward movement.

6. A shield for a cultivator comprising a piece of sheet material having a narrow front end connected about a horizontal pivot, said shield flaring in width towards its rear end and having a downwardly inclined lower edge, said shield at its intermediate portion inclining upwardly and laterally toward a row of plants along which it is adapted to be drawn to protect said plants from being covered by dirt.

In testimony whereof I affix my signature.

GEORGE W. SCHANIL.